United States Patent [19]
Tabata

[11] Patent Number: 5,156,379
[45] Date of Patent: Oct. 20, 1992

[54] FLUID-FILLED INSULATING BUSHING

[75] Inventor: Toshiyuki Tabata, Sagamihara, Japan

[73] Assignee: Nissan Motor Co., Ltd., Yokohama, Japan

[21] Appl. No.: 825,812

[22] Filed: Jan. 21, 1992

Related U.S. Application Data

[63] Continuation of Ser. No. 593,556, Oct. 9, 1990, abandoned, which is a continuation of Ser. No. 208,041, Jun. 17, 1988, abandoned.

[30] Foreign Application Priority Data

Jun. 23, 1987 [JP] Japan .................. 62-155744

[51] Int. Cl.$^5$ .................................... F16F 13/00
[52] U.S. Cl. ...................... 267/140.12; 180/312; 248/562; 248/636; 267/219
[58] Field of Search ............ 267/140.1 R, 140.1 A, 267/140.1 C, 219, 220; 248/562, 636; 180/300, 312, 902

[56] References Cited

U.S. PATENT DOCUMENTS

| | | |
|---|---|---|
| 4,610,438 | 9/1986 | Eberhard et al. ............ 267/140.1 X |
| 4,667,942 | 5/1987 | Bitschkus et al. .................. 267/140 |
| 4,690,389 | 9/1987 | West ................. 267/140.1 |
| 4,693,456 | 9/1987 | Kanda ............................. 267/140.1 |
| 4,702,346 | 10/1987 | Uno et al. ....... 267/140.1 X |
| 4,728,086 | 3/1988 | Ishiyama .............. 248/562 X |
| 4,739,979 | 4/1988 | Kanda ............... 267/140.1 |
| 4,749,173 | 6/1988 | Kanda ............. 248/562 X |

FOREIGN PATENT DOCUMENTS

| | | |
|---|---|---|
| 172700 | 2/1986 | European Pat. Off. . |
| 3222079 | 1/1988 | Fed. Rep. of Germany ...... 248/562 |
| 104824 | 6/1985 | Japan ............................ 267/140.1 A |
| 61-65935 | 4/1986 | Japan . |

Primary Examiner—George E. A. Halvosa
Attorney, Agent, or Firm—Foley & Lardner

[57] ABSTRACT

An insulating bushing through which an engine is supported on a vehicle body. The insulating bushing is comprised of a support elastomeric member tightly interposed between inner and outer cylinders. One of the inner and outer cylinders is connected to one of the engine and the vehicle body while the other is connected to the other of the engine and the vehicle body. The support elastomeric member is formed with main and auxiliary fluid chambers which are separate from each other in the peripheral direction. The main and auxiliary fluid chambers are in communication with each other through an orifice passage formed along the inner periphery of the outer cylinder. Additionally, a flange plate is fixedly disposed within main fluid chamber to divide the fluid chamber into two chambers located side by side in the diametrical direction. The flange plate is located in such a manner that the periphery thereof is separate from the inner side wall surface of the main fluid chamber to form therebetween a clearance through which the two chambers are in communication with each other. The orifice passage constitutes a first dynamic damper system for damping low frequency and large amplitude vibrations while the clearance around the periphery of the flange plate constitutes a second dynamic damper system for damping high frequency and small amplitude vibrations.

17 Claims, 3 Drawing Sheets

FLUID-FILLED INSULATING BUSHING

This application is a continuation of application Ser. No. 07/593,556, filed Oct. 9, 1990, which in turn is a continuation of application Ser. No. 07/28,041, filed June 17, 1988, both abandoned.

BACKGROUND OF THE INVENTION

1. Field of the Invention

This invention relates to an insulating bushing of the type wherein a support elastic member is interposed between inner and outer cylinders and formed with fluid chambers exhibiting a vibration damping effect, and more particularly to such an insulating bushing through which a vibratory body such as an internal combustion engine is supported on a vehicle body, the vibratory body generating both vibrations within a low frequency and large amplitude region and within a high frequency and small amplitude region.

2. Description of the Prior Art

In general, a power unit constituted of an engine and a transmission is supported through power unit mounts (engine mounts) on a vehicle body in order to prevent engine vibration and the like from being transmitted to the vehicle body. Such a power unit mount usually includes an elastic support member made of rubber or the like and securely put between two attachment members which are respectively connected to the vehicle body and the power unit. However, with such a power unit mount, there is possibility of the elastic member being broken and cut into two by any cause. In order to overcome this difficulty and to make the power unit mount small-sized, an insulating bushing of so-called inner-outer cylinder type has been proposed and put into practical use in which an elastic support member is securely disposed between inner and outer a power unit and a vehicle body, while the outer cylinder is connected to the other of them. With the thus configured insulating bushing, the load of the power unit is supported by the elastic member, and the inner cylinder is prevented from getting out of the outer cylinder even if the elastic member is broken and cut into two because the inner cylinder is surrounded by the outer cylinder.

Such an inner-outer cylinder type insulating bushing is disclosed, for example, in Japanese Patent Provisional Publication No. 61-65935. In this insulating bushing, the elastic support member between the inner and outer cylinders is formed with two fluid chambers which are located opposite with respect to the inner cylinder and communicated with each other through an orifice formed in a block securely mounted on the inner cylinder. Accordingly, when relative displacement between the inner and outer cylinders is made along with vibration of the power unit, the elastic support member deforms so that one fluid chamber expands simultaneously with contraction of the other fluid chamber, thereby causing the fluid within the fluid chambers to move through the orifice. This damps vibration of the power unit.

Now, in order to set target vibrations to be damped within a low frequency and large amplitude region, it is required to minimize the spring constant due to expansion elasticity of the fluid chamber or to increase the mass of liquid within the fluid considered to enlarge the cross-sectional area of the orifice for communicating the fluid chambers or to increase the length of the orifice.

However, the orifice in the insulating bushing as disclosed in Japanese Patent Provisional Publication No. 61-65935 must be formed straight because of being formed in the block mounted on the inner cylinder, so that the cross-sectional area and the length of the orifice are small. Consequently, it is very difficult to set the target amplitude region, thus making it impossible to damp engine shake and idling vibration. Additionally in the small cross-sectional area orifice when high frequency and small amplitude vibrations are transmitted to the insulating bushing. Thus, it is also impossible to tune the target amplitude region, thus making impossible to damp high frequency and small amplitude vibrations.

SUMMARY OF THE INVENTION

It is an object of the present invention to provide an improved insulating bushing which enables effective damping of low frequency and large amplitude vibrations such as engine shake and idling vibration while effectively damping high frequency and small amplitude vibrations that cause booming noise within a vehicle passenger compartment.

The insulating bushing of the present invention is comprised of a support elastic member tightly interposed between the inner and outer cylinder. The support elastic member is formed with a hollow defining therein a main fluid chamber. The support elastic member is also formed with an auxiliary fluid chamber which is separate from the main fluid chamber in the peripheral direction. An orifice passage is formed along the inner periphery of the outer cylinder to communicate the main and auxiliary fluid chambers. Additionally, a flange plate fixedly connected to a side of the inner cylinder is disposed within the main fluid chamber to divide the main fluid chamber into first and second chambers in the diametrical direction. The flange plate is such located such that the periphery thereof is separate from the inner wall surface of the main fluid chamber to define therebetween a clearance through which the first and second chambers are in communication with each other.

With the thus configured insulating bushing, the orifice passage for communicating the main and auxiliary fluid chambers is arcuate or annular along the inner periphery of the outer cylinder and therefore can be increased in length and cross-sectional area. Accordingly, the mass of fluid vibrating in the orifice passage increases thereby to set target vibrations to be damped within a low frequency and large amplitude region.

Furthermore, since the main fluid chamber is divided into two chambers by the flange plate, fluid displacement takes place between the two chambers through the clearance formed around the periphery of the flange plate when the side wall of the main fluid chamber deforms upon receiving input vibration. Then, the mass of the fluid displacing through the clearance is very small because of the very short clearance. Thus, by virtue of the flange plate, vibrations within a high frequency and small amplitude region can also be effectively damped.

DETAILED DESCRIPTION OF THE INVENTION

Figure 1:
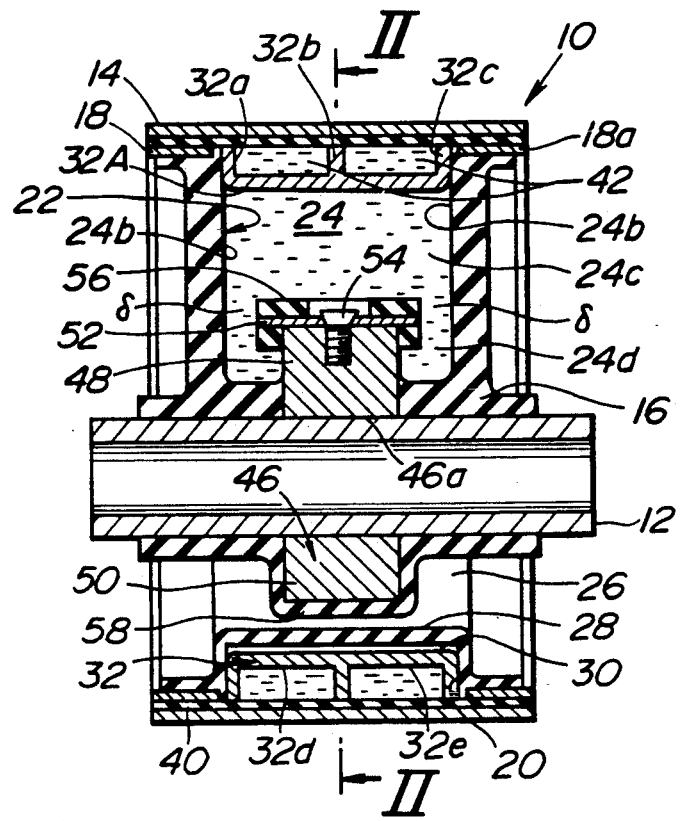
FIG. 1 is a vertical cross-sectional view of a preferred embodiment of the fluid-filled insulating bushing in accordance with the present invention.
Figure 2:
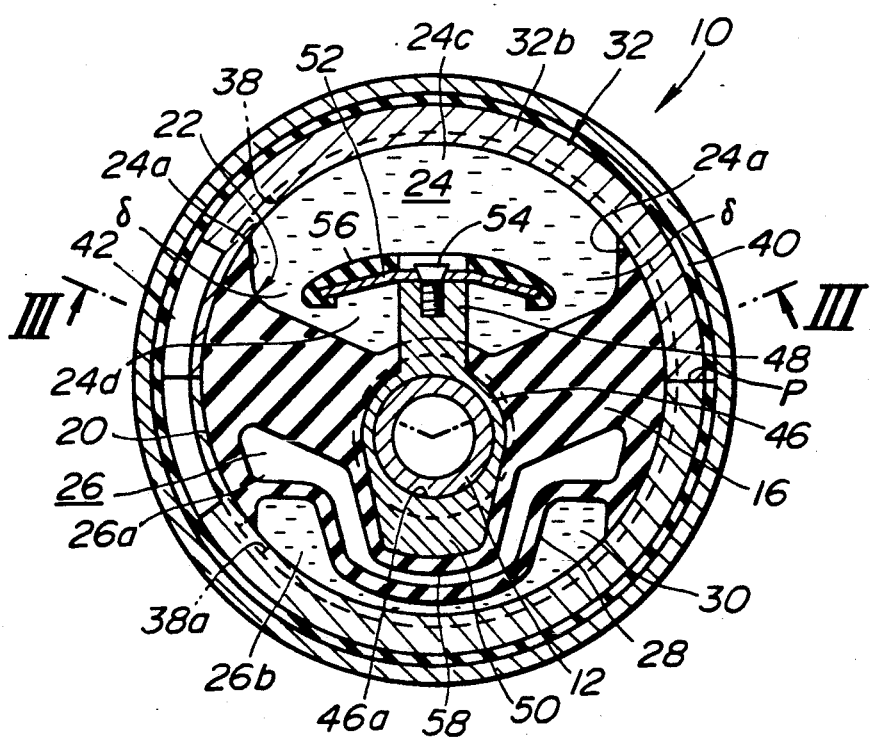
FIG. 2 is a cross-sectional view taken in the direction of arrows substantially along the line II—II of FIG. 1.
Figure 3:
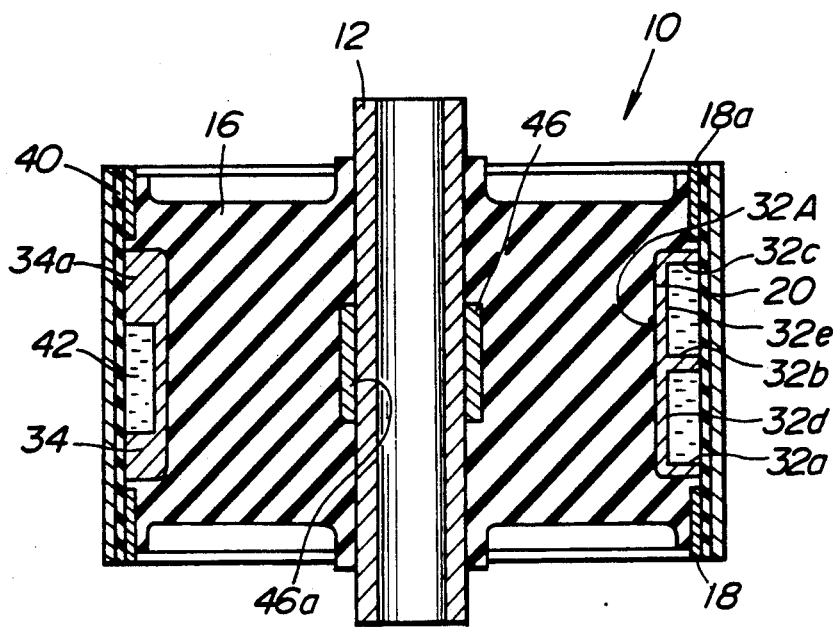
FIG. 3 is a cross-sectional view taken in the direction of arrows substantially along the line III—III of FIG. 2.

Referring now to FIGS. 1 to 3, there is shown a preferred embodiment of a fluid-filled insulating bushing 10 in accordance with the present invention. The insulating bushing 10 is comprised of a support elastic (elastomeric) member 16 tightly interposed between an inner cylinder 12 and an outer cylinder 14. The outer cylinder 14 is disposed surrounding the inner cylinder 12. In this embodiment, the inner cylinder 12 is connected to one of a power unit body of an automotive vehicle through a bolt inserted in the bore of the inner cylinder 12 though not shown. The outer cylinder 14 is connected to the other of the power unit and the vehicle body.

The support elastic member 16 is generally cylindrical to have inner and outer peripheral surfaces. To the inner peripheral surface, the inner cylinder 12 is fixedly secured by means of vulcanization adhesion. Onto the outer peripheral surface of the support elastic member 16, cylindrical first and second intermediate cylinders 18, 18a are fixedly secured by means of the vulcanization adhesion and located at the opposite end sections of the support elastic member 16 in the axial direction or horizontal direction in FIG. 1. An annular groove 20 is formed on the outer peripheral surface of the support elastic member 16 and located between the first and second intermediate cylinders 18, 18a. Within this annular groove 20, an orifice passage forming member 32, which will be discussed in detail after, is fitted.

The support elastic member 16 is formed at a part (an upper section in FIG. 1) thereof with a hollow 22, contiguous or communicating with the above-mentioned groove 20. The hollow 22 has a predetermined length in the peripheral direction. The hollow 22 is filled with a liquid (incompressive fluid) such as water, polyalkylene glycol oil or silicone oil, and serves as a main fluid chamber 24. As shown, the main fluid chamber 24 is defined by the vertical inner side wall surfaces 24a, 24b of the support elastic member 16. The inner side wall surfaces 24a are parallel with an imaginary vertical plane (not shown) passing through the axis of the inner cylinder 12, while the inner side wall surfaces 24b are parallel with an imaginary vertical plane (not shown) to which the axis of the inner cylinder 12 is perpendicular.

The support elastic member 16 is formed at its lower part with a space 26 in which a diaphragm 28 is disposed to divide the space 26 into upper and lower chambers 26a, 26b. The diaphragm 28 is contiguous or integral with the support elastic body 16. The lower chamber 26b is filled with the above-mentioned liquid and serves as an auxiliary fluid chamber 30. The auxiliary fluid chamber 30 is defined between the lower surface of the diaphragm 28 and the inner peripheral surface of the orifice passage forming member 32.

Figure 4:
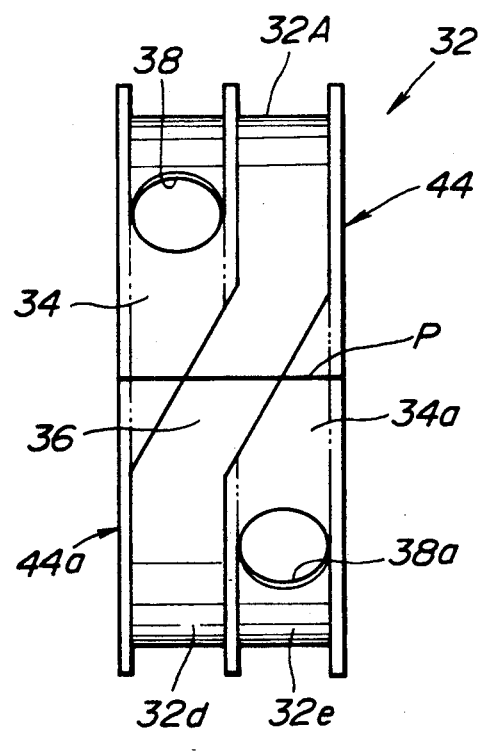
FIG. 4 is a side elevation of an orifice passage forming member used in the insulating bushing of FIG. 1.

The orifice passage forming member 32 is annular and includes a cylindrical bottom plate section 33A. Three annular flange sections 32a, 32b, 32c extend radially outwardly from the bottom plate section 32A. The three annular flange sections 32a, 32b, 32c are parallel with each other and integral with the bottom plate section 32A. The annular flange sections 32a, 32c are located at the opposite ends of the bottom plate section 32A, while the annular flange section 32b is located midway between annular grooves 32d, 32e. As clearly shown in FIG. 4, the annular grooves 32d, 32e are closed or blocked at one part by blocking pieces 34, 34a, respectively, which are integral with the orifice passage forming member 32. The tip of each blocking piece 34, 34A is inclined in such a manner that the tip ends of the blocking pieces 34, 34A are parallel with each other. Additionally, a part of the annular flange section 32A is cut out or removed at a position between the tip ends of the blocking pieces 34, 34a, thereby to form a communication passage 36 through which the two annular grooves 32d, 32e are in communication with each other. The bottom plate section 32A is formed with two openings 38, 38a which are located opposite to each other with respect to the communication passage 36. In other words, the opening 38 is positioned near the blocking piece 34 and between the flange sections 32a, 32b, while the opening 38a is positioned near the blocking piece 34a and between the flange sections 32b, 32c. In the shown state, the opening 38 is in direct communication with the main fluid chamber 24, while the opening 38a is in direct communication with the auxiliary fluid chamber 30. Accordingly, the main and auxiliary fluid chambers 24, 30 are in communication with each other through the annular grooves 32d, 32e which make generally two rounds or turns along the inner periphery of the outer cylinder 14 and through the openings 38, 38a.

A rubber layer 40 is secured to the inner peripheral surface of the outer cylinder 14 by means of vulcanization. In this connection, the intermediate cylinders 18, 18a and the orifice passage forming member 32 mounted on the outer peripheral section of the support elastic member 16 are tightly fitted onto the inner peripheral surface of the rubber layer 40 upon press-fitting them onto the inner peripheral surface of the outer cylinder 14 through the rubber layer 40. By virtue of this press-fitting, a tight seal is formed between the rubber layer 40 and the intermediate cylinders 18, 18a, thereby to establish a liquid-tight seal for the main and auxiliary chambers 24, 30. Additionally, the outer periphery of each flange sections 32a, 32b, 32c of the orifice passage forming member 32 is brought into press contact with the inner peripheral surface of the rubber layer 40, thereby to establish liquid-tight contact therebetween. Thus, the outer peripheral open section of each annular groove 32d, 32e is closed with the rubber layer 40, so that the thus closed annular grooves 32d, 32e constitute an orifice passage 42 which is also filled with the liquid.

The orifice passage forming member 32 consists of two semicylindrical counterparts 44, 44a which are separate and in tight contact with each other at a parting face P. These counterparts 44, 44a are assembled in the annular groove 20 respectively from upper and lower sides when the orifice passage forming member 32 is fitted into the annular groove 20. The orifice passage forming member 32 may consist of three or more arcuate segments.

A metal stopper member 46 is fixedly fitted around the outer peripheral surface of the inner cylinder 12 and located midway between the opposite ends of the inner cylinder 12. The metal stopper member 36 includes a boss section 46a mounted on the inner cylinder 12. The boss section 46a is integrally formed with first and second projections 48, 50 which protrude oppositely with respect to the axis of the boss section 46a. The first projection 48 has a predetermined length and radially outwardly extends to protrude into the main fluid chamber 24. The second projection 50 has a predetermined length and radially outwardly extends to protrude into the upper chamber 26a of the space 26. The first and second projections 48, 50 function to restrict displacement between the inner and outer cylinders 12, 14.

A flange plate 52 is fixedly secured to the tip end of the first projection 48 by means of a bolt 54 so as to be disposed within the main fluid chamber 24. The flange plate 52 is so disposed as to be generally perpendicular to the first projection 48 and extends generally horizontally in such a manner that a clearance δ is formed between the periphery of the plate 52 and the inner side wall surface 24a, 24b of the support elastic member 16. The flange plate 52 divides the main fluid chamber 24 into upper and lower chambers 24c, 24d which are located side by side in the diametrical direction. Thus, the upper and lower chambers 24c, 24d are in communication with each other through the clearance. It is to be noted that the outwardly positioned upper chamber 24c is larger in volume than the inwardly positioned lower chamber 24d, so that a difference is made in volume variation between the upper and lower chambers 24c, 24d when vibration is transmitted so that relative displacement is made between the inner and outer cylinders 12, 14. As shown, the upper surface and the periphery of the flange plate 52 is covered with a rubber layer 56 which functions to soften impact of the flange plate 52 striking against the inner peripheral surface of the orifice passage forming member 32 when the inner cylinder 12 largely displaces upward in FIGS. 1 and 2.

The second projection 50 protruding into the space 26 is covered with a rubber layer 58 which is contiguous and integral with the support elastic member 16, thereby softening impact of the second projection 58 striking through the diaphragm 28 against the inner peripheral surface of the orifice passage forming member 32 when the inner cylinder 12 largely displaces downward in FIGS. 1 and 2.

The manner of operation of the fluid-filled insulating bushing 10 will be discussed hereinafter.

In an installed state of the insulating bushing 10 connecting the power unit and the vehicle body, static load of the power unit is supported in the vertical direction in FIGS. 1 and 2 while vibration of the power unit and engine shake are also supported mainly in the same vertical direction. When such vibration is applied between the inner and outer cylinders 12, 14, the volume of the main fluid chamber 24 first changes along with vertical deformation of the support elastic member 16. At this time, in case the applied vibration is idling vibration, engine shake or the like within a low frequency and large amplitude region, the volume change in the main fluid chamber 24 is larger, so that the liquid in the main fluid chamber 24 and the auxiliary fluid chamber 30. More specifically, during deformation of the main fluid chamber 24 in a direction to be contracted, the liquid within the main fluid chamber 24 is discharged through the opening 38 to the orifice passage 42, and consequently the liquid (in the orifice passage 42) in an amount corresponding to the discharged fluid is supplied through the opening 38a into the auxiliary fluid chamber 30. During deformation of the main fluid chamber 24 in a direction to be expanded, the liquid within the orifice passage 42 flows through the opening 38 into the main fluid chamber 24, and consequently the fluid (in the auxiliary fluid chamber 30) in an amount corresponding to the out flowed liquid is fed through the opening 38a into the orifice passage 42.

Accordingly, within the orifice passage 42, the liquid vibrates along with the volume change of the main fluid chamber 24, i.e., with vibration transmitted between the inner and outer cylinders 12, 14. This corresponds to a liquid column resonance in the insulating bushing 10 thereby to constitute a first dynamic damper system in which the liquid within the orifice passage 42 serves as a mass; and the expansion elasticity of the diaphragm 28 serves as a spring. In this connection, a vibration frequency to be damped or liquid column resonance point in the orifice passage 42 can be easily tuned within a low frequency region as the mass of the liquid is larger.

In this embodiment, the orifice passage 42 is long because it is defined by the orifice passage forming member 32 disposed along the inner periphery of the outer cylinder 14 and is arcuate or annular. Particularly in this embodiment, the orifice passage 42 is formed in the annular grooves 32d, 32e of the two turns and therefore extends making about two turns, along the inner periphery of the outer cylinder 14. This can largely increase the length of the orifice passage 42.

Additionally, since the orifice passage forming member 32 is disposed between the outer cylinder 14 and the support elastic member 16, it is possible to obtain a relatively large space occupied by the orifice passage forming member 32, thereby increasing the cross-sectional area of the orifice passage 42. Thus, the orifice passage 42 in this embodiment is formed larger in length and cross-sectional area, and therefore the liquid mass within the orifice passage 42 can be, largely increased. As a result, since target vibrations be damped can be set within a low frequency region, vibrations within a low frequency and large amplitude region such as idling vibration, engine shake and the like are remarkably suppressed or prevented from being transmitted from the engine side to the vehicle body side.

In case where the vibration input to the insulating bushing 10 is within a high frequency and small amplitude region thereby causing booming noise within a vehicle passenger compartment, the volume of the main fluid chamber 24 changes with the input vibration similarly to the case of transmission of the low frequency and large amplitude vibrations. Since the volume change of the main fluid chamber 24 is of high frequency at this time, the fluid within the long orifice passage 42 is stuck condition so that no displacement of the fluid is accomplished between the main and auxiliary fluid chambers 24, 30.

However, the main fluid chamber 24 is divided by the flange plate 52 into the upper and lower chambers 24c, 24d which communicate with each other through the clearance δ formed between the periphery of the flange plate 52 and the wall surfaces 24a, 24b of the main fluid chamber 24, in which the length of the clearance δ in the direction of thickness of the flange plate 52 is very small. As a result, when the above-mentioned high frequency vibration is transmitted to the insulating bushing 10, displacement of the fluid is made through the clearance δ between the upper and lower chambers 24c, 24d, so that liquid column resonance is generated at the location of the clearance δ. Such liquid displacement is made because the upper chamber 24c is larger in volume variation while the lower chamber 24d is smaller in volume variation relative to a vibration input. Thus, a second dynamic damper system is constituted by the upper and lower chambers 24c, 24d and the clearance δ. In this dynamic damper system, the vertical length of the clearance δ is very small, and therefore the mass of the fluid during the liquid column resonance in the clearance δ is very small. Consequently, another target vibrations to be damped can be easily tuned within a high frequency and small amplitude region. In this embodiment, the frequency of vibration to be damped is set at a frequency $f_1$ which causes booming noise within the vehicle passenger compartment as shown in FIGS. 5A and 5B.

Figure 5A:
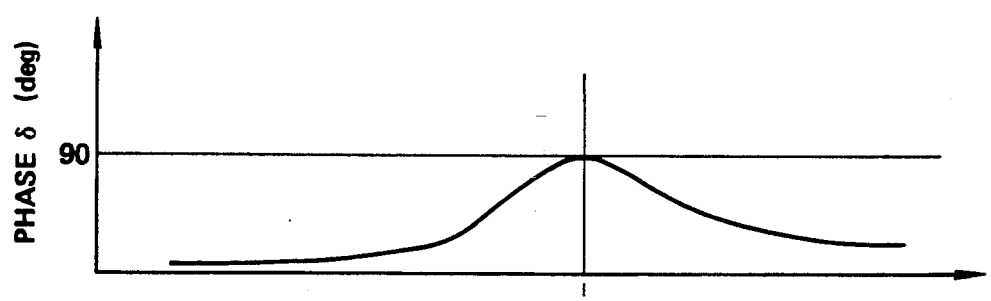
FIGS. 5A and 5B are graphs showing the characteristics of the insulating bushing of FIG. 1.
Figure 5B:
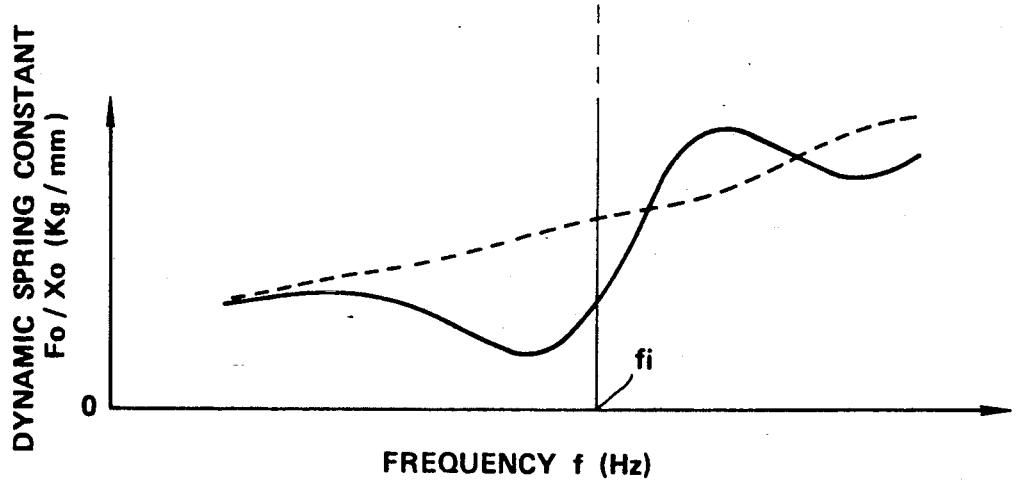

FIG. 5A shows a vibrational phase emerging in the second dynamic damper system, while FIG. 5B shows the dynamic spring constant in the insulating bushing 10 in which a solid line indicates the characteristics of this embodiment while a broken line indicates the characteristics of an insulating bushing which is similar to this embodiment but not provided with the second dynamic damper system. As apparent from the graphs of FIGS. 5A and 5B, by tuning the target vibration to be damped of the second dynamic damper (i.e., liquid column resonance point in the clearance δ) at the booming noise frequency $f_1$, the dynamic spring constant is lowered from higher values indicated by the broken line to lower values indicated by the solid line, thus largely reducing booming noise within the vehicle passenger compartment.

In the characteristics indicated by the solid line in FIG. 5B, high dynamic spring constant values due to reverberation in the second dynamic damper system come out in a higher frequency region over the booming noise frequency $f_1$. However, such a higher frequency region having high dynamic constant values are far from the frequency causing the booming noise, thus providing no considerable problem in noise control.

As described above, since the inner side wall surfaces 24a, 24b of the main fluid chamber 24 are formed parallel with the direction of vibration input or the vertical direction in FIGS. 1 and 2, the cross-sectional area and the vertical length of the clearance δ around the periphery of the flange plate 52 can be maintained constant even during change in volume of the main fluid chamber 24 upon input of high frequency vibrations. Additionally, since the orifice passage forming member 32 defining the orifice passage 42 consists of the counterparts 44, 44a which are divided to upper and lower sides at the parting face P, assembling the orifice passage forming member 32 in the insulating bushing 10 can be facilitated.

It will be understood by those skilled in the art that the foregoing description is a preferred embodiment of the disclosed insulating bushing and that various changes and modifications may be made in the invention without departing from the spirit and scope thereof.

As discussed above, according to the embodiment of the present invention, since the orifice passage communicating the main and auxiliary fluid chambers is arcuate or annular along the inner periphery of the outer cylinder, the orifice passage is set longer. Accordingly, the target vibrations to be damped by the dynamic damper system constituted by the main and auxiliary fluid chambers and the orifice passage can be securely tuned within the low frequency and large amplitude region, thereby suppressing or preventing transmission of vibrations such as idling vibration and engine shake from the engine side to the vehicle body side.

Additionally, by virtue of the flange plate disposed within the main fluid chamber, the main fluid chamber is divided into two chambers which are in communication with each other through a suitable clearance formed between the periphery of the flange plate and the side inner wall surface of the main fluid chamber, the clearance being very short in the vertical direction. These two chambers and the clearance constitute another dynamic damper system which functions when liquid displacement is made through the clearance between the two chambers. The target vibrations to be damped by this dynamic damper system can be tuned within the high frequency and small amplitude region, thereby remarkably suppressing transmission of high frequency vibrations causing booming noise within the vehicle passenger compartment.

Thus, the fluid-filled insulating bushing of the present invention enables simultaneous damping of vibrations within the low frequency and large amplitude region and within the high frequency and small amplitude region, thereby noticeably reducing vehicle body vibration and booming noise within the vehicle passenger compartment. Accordingly, which the fluid-filled insulating bushing is used as an engine mount, riding comfort of the vehicle and habitability of passengers can be effectively improved.

What is claimed is:
1. A fluid-filled insulating bushing comprising:
an inner cylinder;
an outer cylinder disposed surrounding said inner cylinder;
a support elastic member tightly interposed between said inner and outer cylinder and including a main section for supporting load applied between said inner and outer cylinders, said main section being formed with a hollow defining therein a main fluid chamber;
means defining an auxiliary fluid chamber, said auxiliary fluid chamber being separate from said main fluid chamber in peripheral direction, said auxiliary fluid chamber defining means including a diaphragm integral with but separate from aid support elastic member main section so as to be freely movable relative to said main section, said auxiliary fluid chamber being on the outside of said diaphragm relative to said inner cylinder and an inner surface of said diaphragm defining an air-filled chamber;
means or damping vibrations having a low frequency and large amplitude comprising an orifice passage formed along an inner periphery of said outer cylinder to communicate said main and auxiliary fluid chambers; and
means for damping vibrations having a high frequency and small amplitude comprising a flange plate impervious to fluid flow fixedly connected to a side of said inner cylinder and disposed within said main fluid chamber to divide said main fluid chamber into first and second chambers in a diametrical direction, a radially outer periphery of said flange plate being separate from an inner walls surface of said main fluid chamber to define therebetween a clearance through which said first and second chambers are in communication with each other, upper and lower surfaces of said flange plate contacting fluid in the first and second chambers on its upper and lower surfaces respectively.

2. A fluid-filled insulating bushing as claimed in claim 1, further comprising mean by which a side inner wall surface of said main fluid chamber is parallel with a plane extending in direction of input of vibration.

3. A fluid-filled insulating bushing as claimed in claim 1, wherein said orifice passage includes an annular orifice passage forming member disposed between said outer cylinder and said support elastic member.

4. A fluid-filled insulating bushing as claimed in claim 3, wherein said orifice forming member includes a bottom cylindrical plate section extending along and spaced from the inner periphery of said outer cylinder, and a plurality of annular flange sections each extending radially outwardly from said bottom cylindrical plate section to the inner periphery of said outer cylinder to define an annular space between the adjacent flange sections, means for establishing communication between the adjacent annular spaces and blocking a part of each annular space to make said orifice passage linear, said linear orifice passage extending a plurality of rounds along the inner periphery of said outer end section communicated with said main fluid chamber and a second end section communicated with said auxiliary fluid chamber.

5. A fluid-filled insulating bushing as claimed in claim 4, further comprising a rubber layer interposed between said outer cylinder and said support elastic member, said annular flange sections of said orifice passage forming member being in tight contact with said rubber layer.

6. A fluid-filled insulating bushing as claimed in claim 3, wherein aid orifice passage framing member includes a plurality of arcuate segments.

7. A fluid-filled insulating busing as claimed in claim 3, wherein said auxiliary chamber is between said diaphragm and said orifice passage forming member.

8. A fluid-filled insulating bushing as claimed in claim 3, wherein aid main fluid chamber is defined between said support elastic member and said orifice passage forming member.

9. A fluid-filled insulating bushing as claimed din claim 1, wherein aid orifice passage has a length to make half round or more around said support elastic member.

10. A fluid-filled insulating bushing as claimed in claim 1, further comprising a projection member extending from said inner cylinder member into said main fluid chamber, said projection member having a tip end and said flange plate being fixedly secured to said tip end of said projection member.

11. A fluid-filled insulating bushing as claimed in claim 10, wherein said projection member extends generally in the direction of input of vibration, said flange plate being generally perpendicular to said projection member.

12. A fluid-filled insulating bushing as claimed in claim 1, wherein said fist chamber is located outward relative to said second chamber, said fist chamber being larger in volume than said second chamber.

13. A fluid-filled insulating bushing as claimed in claim 1, further comprising incompressive fluid filled in said main and auxiliary fluid chambers and said orifice passage.

14. A fluid-filled insulating bushing comprising:
an inner cylinder;
an outer cylinder disposed surrounding the inner cylinder;
a support elastic member tightly interposed between he inner and outer cylinders and formed with a hollow defining a main fluid chamber;
means defining an auxiliary fluid chamber formed in the support elastic member, the auxiliary fluid chamber being separate from the main fluid chamber in the peripheral direction;
means for damping vibrations having a low frequency and large amplitude comprising an orifice passage formed along the inner periphery of said outer cylinder to communicate he main and auxiliary fluid chambers;
means for damping vibrations having a high frequency and small amplitude comprising a flange plate impervious to fluid flow fixedly connected to the inner cylinder and disposed within the hollow in the support elastic member, the flange plate dividing the main fluid chamber in a diametrical direction into first and second chambers and having upper and lower surfaces that contact fluid in the first and second chambers, respectively; and
communication means between the first and second chambers comprising a clearance formed between a radially outer periphery o the flange plate and an inner wall surface o the main fluid chamber.

15. A fluid-filled insulating bushing as claimed in claim 14, additionally comprising means for restricting displacement between the inner and outer cylinders comprising a stopper member fixedly fitted to the inner cylinder, the flange plate being fixedly connected to the inner cylinder by means of a projection on the stopper member.

16. A fluid-filled insulating bushing as claimed in claim 15, wherein the flange plate and he projection define a generally T-shaped structure in cross-section.

17. The fluid-filled insulating bushing as claimed in claim 14, wherein the auxiliary chamber defining means includes a diaphragm contiguous with said support elastic member, the auxiliary chamber being defined between eh diaphragm and the orifice passage.

* * * * *